3,352,750
Patented Nov. 14, 1967

3,352,750
ALKYL - SUBSTITUTED - BENZOQUINONE - 4-
OXIMINYL N - ALKYL CARBAMATES AND
USE AS FUNGICIDES
George A. Buntin, Wilmington, Del., assignor to Hercules
Incorporated, a corporation of Delaware
No Drawing. Filed Apr. 2, 1964, Ser. No. 356,933
9 Claims. (Cl. 167—30)

ABSTRACT OF THE DISCLOSURE

The compounds are of the class of carbamic acid esters derived from substituted-benzoquinone oximes, useful as foliage or soil fungicides. A representative compound is 2,6-di-t-butyl-benzoquinone - 4 - oximinyl N-methylcarbamate, having a melting point of 123–125° C.

This invention relates to alkyl-substituted-benzoquinone-4-oximinyl N-alkylcarbamates, to fungicidal compositions in which said carbamates are employed as the active ingredients and to a method of controlling fungus growth.

According to this invention, there are provided new and valuable compounds of the formula

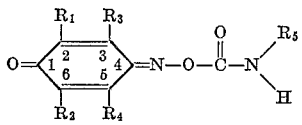

wherein $R_5$ is a methyl or ethyl group; $R_1$, $R_2$, $R_3$, and $R_4$ are hydrogen, alkyl containing from one to five carbon atoms or cycloalkyl containing from three to eight carbon atoms, providing that at least one of $R_1$, $R_2$, $R_3$, or $R_4$ is said alkyl or said cycloalkyl.

Typical examples of compounds of this invention include 2-methylbenzoquinone-4-oximinyl N-methylcarbamate,
2-t-butylbenzoquinone-4-oximinyl N-methylcarbamate,
3-isopropylbenzoquinone-4-oximinyl N-methylcarbamate,
2-cyclohexylbenzoquinone-4-oximinyl N-methylcarbamate,
2-cyclohexylbenzoquinone-4-oximinyl N-ethylcarbamate,
3,5-dimethylbenzoquinone-4-oximinyl N-methylcarbamate,
3,5-dimethylbenzoquinone-4-oximinyl N-ethylcarbamate,
2,6-dimethylbenzoquinone-4-oximinyl N-methylcarbamate,
2,6-diisopropylbenzoquinone-4-oximinyl N-methylcarbamate,
2,6-di-t-butylbenzoquinone-4-oximinyl N-methylcarbamate,
2,6-di-t-amylbenzoquinone-4-oximinyl N-methylcarbamate,
2-methyl-5-t-butylbenzoquinone-4-oximinyl N-methylcarbamate,
2-isopropyl-6-t-butylbenzoquinone-4-oximinyl N-methylcarbamate,
2-ethyl-6-sec-butylbenzoquinone-4-oximinyl N-methylcarbamate,
2-cyclohexyl-6-t-butylbenzoquinone-4-oximinyl N-methylcarbamate,
2-cyclopentyl-5-sec-butylbenzoquinone-4-oximinyl N-methylcarbamate,
2-methyl-6-isopropylbenzoquinone-4-oximinyl N-methylcarbamate,
2-methyl-6-isopropylbenzoquinone-4-oximinyl N-ethylcarbamate,
2-methyl-5-isopropylbenzoquinone-4-oximinyl N-methylcarbamate,
2-methyl-5-isopropylbenzoquinone-4-oximinyl N-ethylcarbamate,
2-t-butyl-6-methylbenzoquinone-4-oximinyl N-ethylcarbamate,
2,3,6-tri-t-butylbenzoquinone-4-oximinyl N-methylcarbamate, and
2,3,5,6-tetramethylbenzoquinone-4-oximinyl N-methylcarbamate.

The compounds of this invention may be prepared by the reaction of an alkyl-substituted-phenol with nitrous acid to form an alkyl-substituted-benzoquinone-4-oxime followed by the reaction of the oxime with an alkyl isocyanate. Preparation of the oxime can also occur by the reaction of an alkyl-substituted-quinone with hydroxylamine. Preparation of the carbamate from the oxime can also occur by the reaction of the oxime with alkyl carbamoylchloride or by the reaction of the oxime with phosgene and alkyl amines.

The following examples are illustrative of the method of preparing the compounds of this invention and of the manner of using them. All parts are by weight.

Example 1

To 77.5 parts of 2,6-di-t-butylphenol and 60.9 parts of concentrated aqueous HCl (37%) in 473.4 parts of denatured ethanol at 0° C. was added slowly with stirring a solution of 26.4 parts of $NaNO_2$ in 120 parts of water. The mixture was stirred for an additional one-half hour as it warmed to 10° C. About 1000 parts of water was then added to the mixture, and the yellow solid that separated was filtered off, washed with water, dried and washed with hexane. The product was further dried under vacuum. Seventy-seven and one-half parts, a yield of 92% of theory, of 2,6-di-t-butylbenzoquinone-4-oxime, having a melting point of 216–219° C. (221–222° C. when recrystallized from benzene) was obtained. It analyzed 5.78% N compared to a calculated value of 5.95% N for 2,6-di-t-butylbenzoquinone-4-oxime.

Example 2

To 75 parts of 2,6-di-t-butylbenzoquinone-4-oxime, prepared to a calculated value of 5.95% N for 2,6-di-t-butylbenzene and 237.3 parts of acetone was added 0.73 part of triethylamine. With cooling at 20° C., 22 parts of methyl isocyanate was added slowly to the above solution. The resulting solution was maintained at room temperature for about an hour and the solvents were then evaporated off in a stream of air. The yellow crystalline residue was triturated with hexane, filtered, washed with hexane and dried. Eighty-nine and four-fifths parts, a yield of 97.5% of theory, of orange-yellow crystalline 2,6-di-t-butylbenzoquinone-4-oximinyl N-methylcarbamate was obtained. It had melting point of 123–125° C. and analyzed 9.59% N compared to a calculated value of 9.6% N.

Example 3

Thirty-six parts of sodium nitrite was slowly added to 41 parts of 3,5-dimethylphenol and 319 parts of concentrated aqueous (37%) HCl in 197.3 parts of ethanol at 0° C. When the addition was completed the mixture was stirred for about one-half hour as it warmed to 10° C. Four thousand parts of water was then added to the mixture and the yellow solid that separated was filtered off, washed with water, dried and washed with hexane. Forty-seven and three tenths parts of 3,5-dimethylbenzoquinone-4-oxime which analyzed 8.43% N compared to a calculated value of 9.27% N, was prepared.

Example 4

To ten parts of the 3,5-dimethylbenzoquinone-4-oxime, prepared in Example 3, in a mixture of 26.4 parts of dry benzene and 23.7 parts of acetone, was added 0.098 part of triethylamine and five parts of methylisocyanate in the same manner as described in Example 2. Thirteen and four tenths parts of yellow-green solid was obtained, which analyzed 13.2% N compared to a calculated value of 13.4% N for 3,5-dimethylbenzoquinone-4-oximinyl N-methylcarbamate.

*Example 5*

To ten parts of the 3,5-dimethylbenzoquinone-4-oxime, prepared in Example 3, in a mixture of 26.4 parts of dry benzene and 23.7 parts of acetone was added 0.098 part of triethylamine and 6 parts of ethylisocyanate. Eleven and one fifth parts of yellow powder was obtained which analyzed 12.3% N compared to a calculated value of 12.6% for 3,5-dimethylbenzoquinone-4-oximinyl N-ethylcarbamate.

*Examples 6–17*

Following the procedures described in the preceding examples, several additional carbamates were prepared and characterized. The compounds are described in Table I.

(highly effective) to X (ineffective) was established to compare the effectiveness of the compounds tested. The classification system used is shown in the following table.

TABLE II

| Disease index: | Class |
|---|---|
| 0–0.5 | AA |
| 0.6–5 | A |
| 5.1–15 | B |
| >15.1 | X |

In this test, at a concentration of 0.05% by weight of active material based on the total weight of the composition 2,6-di-t-butylbenzoquinone-4-oximinyl N-methylcarbamate resulted in a D.I. of 0.3 for a rating of AA.

(B) *Eradicant test.*—A squash plant was inoculated with mildew spores of *Erysiphe cichoracearum* several days before it was sprayed with the active compositions. A plant having visible mildew colonies on the upper leaf surface was selected for this test. Fifteen days after spraying, the plant was rated in the same manner as in the protectant test.

TABLE I

| Ex. No. | Compound | Reaction Conditions Parts | | Product | |
|---|---|---|---|---|---|
| | | Oxime | Isocyanate | Percent N Found | Percent N Calculated |
| 6 | 2,6-dimethylbenzoquinone-4-oximinyl N-methylcarbamate | 32 | 15 | 13.0 | 13.4 |
| 7 | 2,6-diisopropylbenzoquinone-4-oximinyl N-methylcarbamate | 60 | 20 | 10.5 | 10.7 |
| 8 | 2,6-di-t-amylbenzoquinone-4-oximinyl N-methylcarbamate | 100 | 30 | 8.4 | 8.7 |
| 9 | 2-methyl-6-t-butylbenzoquinone-4-oximinyl N-methylcarbamate | 100 | 35 | 11.4 | 11.2 |
| 10 | 2-ethyl-6-sec-butylbenzoquinone-4-oximinyl N-methylcarbamate | 60 | 23 | 10.8 | 10.6 |
| 11 | 2-isopropyl-6-t-butylbenzoquinone-4-oximinyl N-methylcarbamate | 80 | 30 | 10.5 | 10.2 |
| 12 | 2-cyclohexyl-6-t-butylbenzoquinone-4-oximinyl N-methylcarbamate | 100 | 28 | 7.8 | 8.8 |
| 13 | 2-t-butylbenzoquinone-4-oximinyl N-methylcarbamate | 100 | 50 | 12.1 | 11.9 |
| 14 | 3-isopropylbenzoquinone-4-oximinyl N-methylcarbamate | 80 | 35 | 13.0 | 12.6 |
| 15 | 5-methyl-2-isopropylbenzoquinone-4-oximinyl N-methylcarbamate | 100 | 50 | 11.3 | 11.8 |
| 16 | 5-methyl-2-isopropylbenzoquinone-4-oximinyl N-ethylcarbamate | 100 | 50 | 11.4 | 11.2 |
| 17 | 2-t-butyl-5-methylbenzoquinone-4-oximinyl N-ethylcarbamate | 80 | 40 | 10.7 | 10.6 |

*Example 18*

In this example, 2,6-di-t-butylbenzoquinone-4-oximinyl N-methylcarbamate was tested as an eradicant and as a protectant against powdery mildew of a squash plant. Four parts of the 2,6-di-t-butylbenzoquinone-4-oximinyl N-methylcarbamate which was prepared in Example 2 was dissolved in 100 parts of acetone. One part of Tween 20 (polyoxyethylene sorbitan monolaurate, Zimmerman and Lavine, Handbook of Material Trade Names, 586–587 (1953), and Supplement I, 248 (1956)) was added to the above solution and sufficient water was added to bring the total weight up to 2000 parts. This results in a suspension containing 0.2% by weight of active compound based on the weight of the total suspension. Further dilution of this suspension with water resulted in compositions containing 0.1% by weight and 0.05% by weight of the active compound.

(A) *Protectant test.*—A healthy squash plant, without mildew, was used to determine the protectant activity of the test compound. The upper rear surfaces of the squash plant were sprayed with the formulated compound using a standard spraying procedure. After spraying, the squash plant was held in the greenhouse until the spray deposit had dried. The plant was then inoculated with spores of a pathogenic powdery mildew by dusting spores from infested leaves onto the squash plant. Spores of *Erysiphe cichoracearum* were used to inoculate the squash plant.

When sufficient mildew was present on the control plant (in this case, 20 days after spraying) the plant was rated by counting the number of mildew colonies on the two cotyledon leaves of the plant. A disease index (D.I.) was calculated for the test compound by dividing the number of colonies recorded for the test compound by the number of colonies recorded for the control and multiplying by 100.

A system of rating the compounds ranging from AA

At a concentration of 0.2% by weight of active material based on the total weight of the composition 2,6-di-t-butylbenzoquinone - 4 - oximinyl N-methylcarbamate resulted in a D.I. of 0.0 for an AA rating while at a concentration of 0.1% by weight, a D.I. of 2.6 was recorded which corresponds to an A rating.

*Example 19*

Following the procedure of Example 18, several other compounds of this invention were tested for fungicidal activity against powdery mildew. The results are tabulated in Table III.

TABLE III

| Compound: | Powdery mildew squash protectant 0.2% |
|---|---|
| 2,6-diisopropylbenzoquinone-4-oximinyl N-methylcarbamate | AA |
| 2,6-di-t-amylbenzoquinone-4-oximinyl N-methylcarbamate | A |
| 2-isopropyl-6-t-butylbenzoquinone-4-oximinyl N-methylcarbamate | AA |
| 2-ethyl-6-sec-butylbenzoquinone-4-oximinyl N-methylcarbamate | AA |
| 2-cyclohexyl-6-t-butylbenzoquinone-4-oximinyl N-methylcarbamate | AA |

*Example 20*

3,5 - dimethylbenzoquinone-4-oximinyl N-methylcarbamate was formulated into a fungicidal composition by dissolving four parts thereof into 100 parts of acetone and adding about 0.1 part of Tween 20. Enough water to give the desired concentration of test material was added.

Soil which had been infested with *Phythium debaryanum*, which is a casual agent of pre-emergence damping off, was used in this test. The infested soil was a one to one mixture of topsoil and builders sand.

One part of infested soil was combined with four parts of normal soil and the formulation of test compound at a given concentration (usually five and ten pounds per acre) was added to the soil. The treated infested soil was then placed into three replicate pint baskets and ten pea seeds were planted to a depth of about one inch.

Approximately 14 days after the soil treatments were completed, the number of emerged seedlings was recorded and the average percentage emergence for individual treatment concentration was calculated. The degree of control obtained was determined by comparing the average percentage for the treatment with that of a control.

In this test, 3,5-dimethylbenzoquinone-4-oximinyl N-methylcarbamate permitted 100% emergence at both ten and five pounds per acre treatment rate, whereas the control permitted 43% emergence at both rates.

*Example 21*

Following the procedure of Example 20, 3,5-dimethylbenzoquinone-4-oximinyl N-ethylcarbamate was tested for fungicidal activity. At both ten and five pounds per acre treatment rate, 3,5-dimethylbenzoquinone-4-oximinyl N-ethylcarbamate permitted 97% emergence, whereas the control permitted 43% emergence.

As the examples indicate, those compounds which are substituted in the 2- and 6-positions with alkyl groups totaling between six and ten carbon atoms are extremely effective for control of powdery mildew. 2,6-di-t-butyl-benzoquinone-4-oximinyl N-methylcarbamate is one example of such compounds. Accordingly, a preferred aspect of this invention is the use of these compounds for such control.

Also apparent from the examples is the soil fungicidal activity of compounds substituted in the 3- and 5-positions with alkyl groups. 3,5-dimethylbenzoquinone-4-oximinyl N-methylcarbamate and 3,5-dimethylbenzoquinone-4-oximinyl N-ethylcarbamate are two examples of such compounds. Accordingly, this is another preferred aspect of the invention.

The compounds of this invention will be used as fungicides by distribution in low concentrations on the plants or soil which are to be treated. Several compositions containing the compounds of this invention may be utilized to distribute the fungicidally active compound onto the plants or soil. Suitable compositions include emulsions, suspensions, solutions, dusts, wettable powders and granules. Preferred compositions include dusts, emulsions, and wettable powders. A concentrated composition for dilution will comprise the compound in admixture with a surface-active agent. The concentrated composition may then be diluted with a fungicide carrier either immediately or just prior to use.

Surface-active agents which may be utilized in the preparation of the compositions of this invention may be any of the well known organic anionic, cationic or nonionic surface-active agents commonly used in the pesticide art. Examples of such agents are disclosed in Chemistry of Insecticides, Fungicides and Herbicides, by Donald E. H. Frear, second edition, pp. 280–287, 1948.

Any of the well known carriers may be employed as carriers for the fungicidally active compound of this invention. Numerous examples of such carriers are disclosed in Chemistry of the Pesticides by Donald E. H. Frear, third edition, pp. 5–6, 1955.

In the compositions of this invention, the active agent will be present in fungicidally effective amounts. The amount of active agent which may be present in the fungicidal concentrates of this invention will be from about 5% to about 80% by weight based on the total weight of the concentrate. The amount of surface-active agents employed in the preparation of the fungicidal concentrates of this invention will be from about 1% to about 10% by weight based on the total weight of the concentrate.

The amount of active agent which may be present in the diluted fungicidal compositions will depend upon the form of the composition. Generally, however, between about 0.05% and about 5.0% by weight of the fungicidally active agent based on the weight of the total composition will be used.

The compounds of this invention may be used as the sole toxic agent in fungicide formulations or they may be used in admixture with other toxicants to supplement the properties of the fungicide formulation. Toxicants which may be used in admixture with the compounds of this invention include insecticides and other fungicides. The compounds of this invention have also been found to possess nematocidal activity and, accordingly, may be employed in the inhibition of nematode growth.

What I claim and desire to protect by Letters Patent is:
1. A compound of the formula

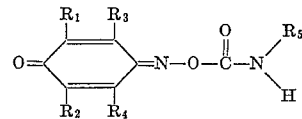

wherein $R_5$ is selected from the group consisting of methyl and ethyl; and $R_1$, $R_2$, $R_3$ and $R_4$ are selected from the group consisting of hydrogen, alkyl containing from one to five carbon atoms and cycloalkyl containing from three to eight carbon atoms, providing that at least one of $R_1$, $R_2$, $R_3$ and $R_4$ is selected from the group consisting of alkyl and cycloalkyl.

2. 2,6 - di-t-butylbenzoquinone-4-oximinyl N-methylcarbamate.

3. 3,5 - dimethylbenzoquinone-4-oximinyl N-methylcarbamate.

4. 3,5 - dimethylbenzoquinone-4-oximinyl N-ethylcarbamate.

5. 2,6 - di-isopropylbenzoquinone-4-oximinyl N-methylcarbamate.

6. 2 - methyl - 5-isopropylbenzoquinone-4-oximinyl N-methylcarbamate.

7. A fungicidal composition comprising a fungicidally effective amount of the compound of claim 1 in admixture with a fungicide carrier.

8. A method of controlling fungus growth which comprises distributing a fungicidally effective amount of the compound of claim 1 onto a fungus-susceptible habitat.

9. A fungicidal concentrate comprising a fungicidally effective amount of the compound of claim 1 in admixture with a surface-active agent selected from the group consisting of organic anionic, cationic and nonionic surface-active agents.

References Cited
UNITED STATES PATENTS

| | | | |
|---|---|---|---|
| 2,394,280 | 2/1946 | Williams | 167—30 |
| 2,403,495 | 7/1946 | Bowen | 167—30 |
| 2,741,625 | 4/1956 | Pederson | 260—396 |
| 2,935,518 | 5/1960 | Reetz | 260—396 |

OTHER REFERENCES

Borat et al.: Nature, vol. 182 (1958), pp. 1017 to 1018.

LORRAINE O. WEINBERGER, *Primary Examiner.*

JULIAN S. LEVITT, *Examiner.*

V. C. CLARKE, L. A. THAXTON, *Assistant Examiners.*

UNITED STATES PATENT OFFICE
CERTIFICATE OF CORRECTION

Patent No. 3,352,750                            November 14, 1967

George A. Buntin

It is hereby certified that error appears in the above numbered patent requiring correction and that the said Letters Patent should read as corrected below.

Column 2, line 42, for "to a calculated value of 5.95% N for 2,6-di-t-butylbenzene" read -- in Example 1, in a mixture of 351.6 parts of dry benzene --; column 3, line 58, for "rear" read -- leaf --.

Signed and sealed this 7th day of January 1969.

(SEAL)
Attest:

Edward M. Fletcher, Jr.                            EDWARD J. BRENNER
Attesting Officer                                       Commissioner of Patents